United States Patent [19]

Hayashi et al.

[11] Patent Number: 4,608,005
[45] Date of Patent: Aug. 26, 1986

[54] CLAMPING DEVICE

[75] Inventors: Keizo Hayashi, Nagoya; Hitoshi Hasegawa, Ichinomiya, both of Japan

[73] Assignee: Toyoda Gosei Co., Ltd., Nishikasugaigun, Japan

[21] Appl. No.: 664,687

[22] Filed: Oct. 25, 1984

[30] Foreign Application Priority Data

Oct. 27, 1983 [JP] Japan .................. 58-201432

[51] Int. Cl.⁴ .......................................... B29C 45/64
[52] U.S. Cl. ..................... 425/192 R; 249/25; 249/151; 249/165; 249/219 R; 425/193; 425/451.7; 425/451.9; 425/595; 425/DIG. 129
[58] Field of Search ............... 249/25, 82, 95, 151, 249/152, 219 R, 139, 165, 154, 166, 217; 425/190, 192 R, 193, 195, 451.7, 451.9, 595, DIG. 5, DIG. 129, 318

[56] References Cited

U.S. PATENT DOCUMENTS 3,843,088 10/1974 McLoughlin et al. ........ 425/DIG. 5
4,535,689 8/1985 Putkowski ................ 425/451.7

Primary Examiner—Jay H. Woo
Assistant Examiner—Timothy W. Heitbrink
Attorney, Agent, or Firm—Cushman, Darby & Cushman

[57] ABSTRACT

A clamping device of this invention is constructed of bases on which molds are slidably moved, regulating portions each provided above the corresponding base and having a clamping surface which is inclined relative to the base, shifting means provided beside the bases and for shifting each mold placed on the base in a direction to which the space between the base and the clamping surface progressively narrows and a spacer fixedly mounted on the upper surface of the mold, the upper surface of which being in the form of an arc in the direction to which the mold is moved. In use, each of the molds placed on the base is moved by the shifting means. The mold is then sandwiched between the base and the clamping surface and clamped to a wedge configuration.

3 Claims, 4 Drawing Figures

CLAMPING DEVICE

BACKGROUND OF HE INVENTION

1. Field of the Invention

This invention relates to a clamping device which clamps molds used for transfer or injection molding of rubber or resin.

2. Description of the Prior Art

Heretofore, in a clamping device used for this kind of molding, for example, a mold 1 including an upper molding piece 1a and a lower molding piece 1b is sandwiched between pressure plates 3, 4 and is, then, clamped by means of a clamping cylinder 2 as shown in FIG. 1. It should be mentioned, however, that clamping force of the clamping cylinder 2 always needs be maintained during molding. Furthermore, it is difficult for only one clamping cylinder 2 to clamp a plurality of molds 1 at the same time. Thus, there are disadvantages that such clamping device is of larger size and is costly.

SUMMARY OF THE INVENTION

It is an object of this invention to provide a clamping device which requires less clamping force than a conventional clamping device.

It is another object of this invention to provide a clamping device which enables maintaining clamping force after the completion of clamping process without using other power means and which enables clamping a plurality of molds by the use of one clamping cylinder or the like, thereby reducing the size and cost thereof.

In order to achieve the above-mentioned objects, a clamping device according to this invention is constructed of a base on which a mold is slidably moved, regulating portions, provided above the base and having a clamping surface which is inclined relative to the base, shifting means provided beside the base and for shifting the mold placed on the base in a direction to which the space between the base and the clamping surface progressively narrows and a spacer fixedly mounted on the upper surface of the mold, the upper surface of which being in the form of an arc in a direction to which the mold is moved. Each mold placed on the base is moved by the shifting means and is sandwiched between the base and the clamping surface and then, clamped to a wedge configuration.

DESCRIPTION OF THE PREFERRED EMBODIMENTS

Figure 1:
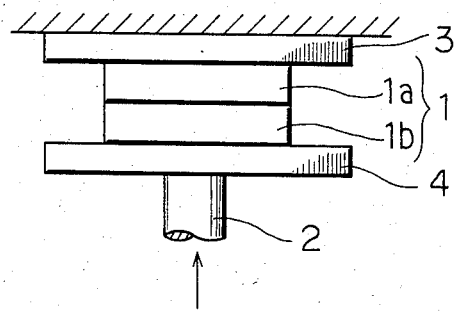
FIG. 1 is a side elevation view showing a conventional clamping device.
Figure 2:
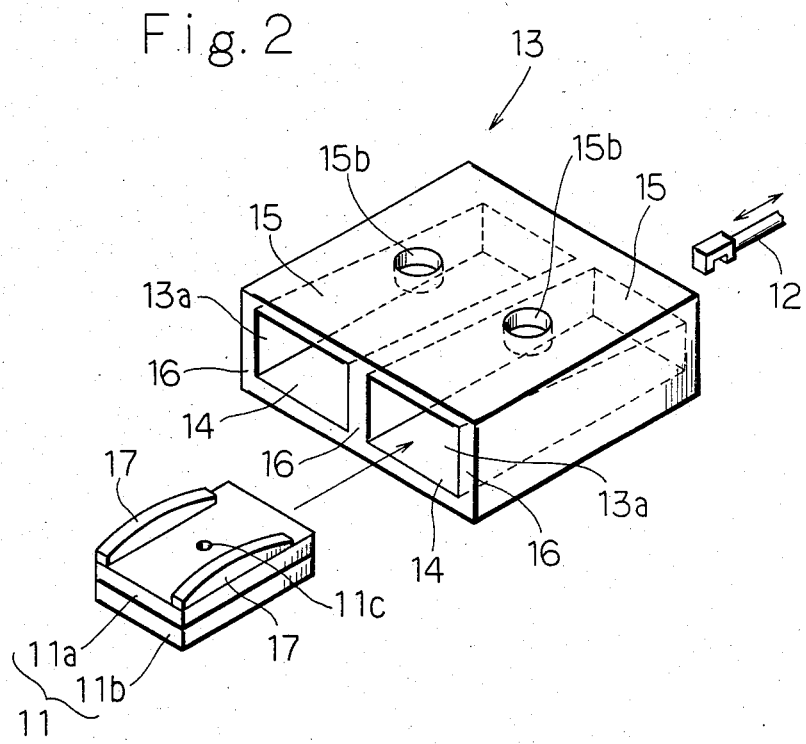
FIG. 2 is a perspective view of a clamping device according to one embodiment of this invention.
Figure 3:
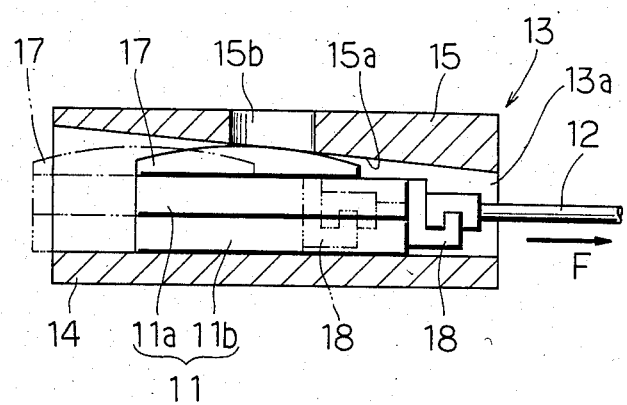
FIG. 3 is a vertical sectional view showing the manner in which the clamping device according to the embodiment of this invention is used.
Figure 4:
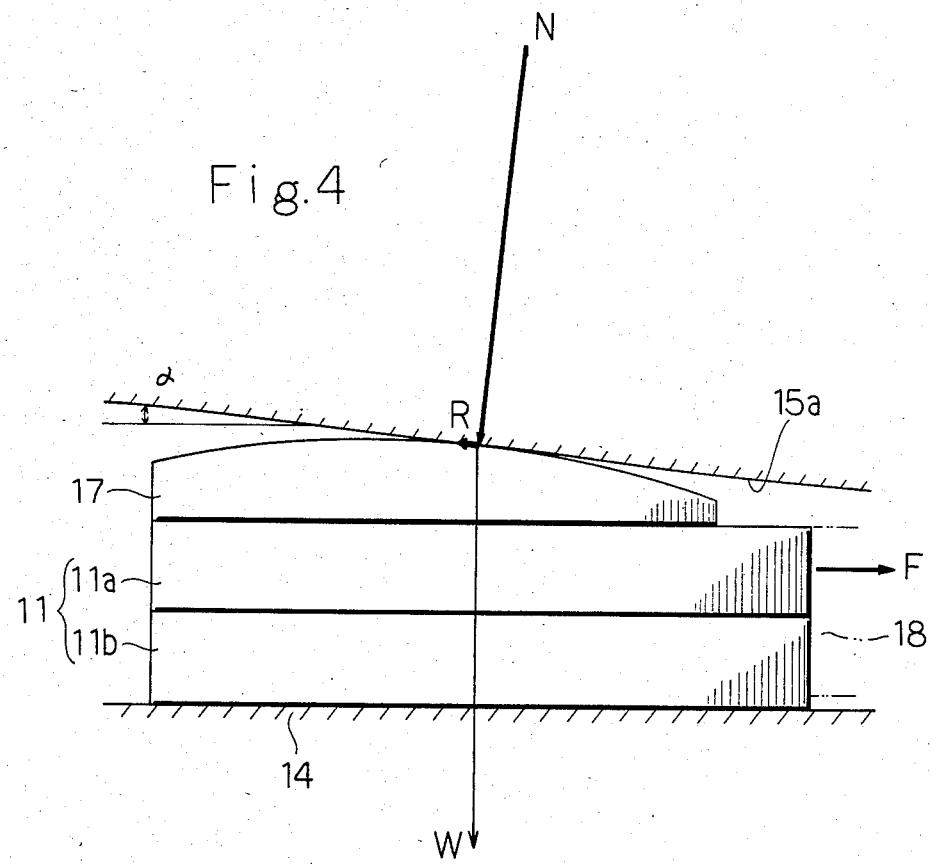
FIG. 4 is an enlarged view showing the principal part of FIG. 3.

In a clamping device according to one embodiment of this invention, each mold 11 including an upper molding piece 11a and a lower molding piece 11b is clamped in a holder 13 in the form of a box having two horizontally extending holes 13a. Formed on the lower surface of each of the two insert holes or chambers 13a which open through opposite ends of the holder is a base 14 in the form of a plane on which the mold 11 is slidably moved. On the other hand, formed on the upper surface of each of the insert holes 13a is a clamping surface 15a which is inclined relative to the corresponding base 14 in such a manner that the space between the base and the clamping surface is progressively narrower towards the respective rear portion thereof. Each of regulating portions 15 is connected via side walls 16 to the base 14. Further, formed near the central portion of the two insert holes 13a in its axial direction are apertures 15b, 15b through which an injection pot or a nozzle of an injection machine is inserted for the purpose of supplying material into the mold 11 when the mold 11 is clamped.

The holder 13 is shifted from one process to another in a circulating manner by a feed means (not shown), such processes including clamping, material injecting, vulcanizing, mold opening and closing, mold removing and the like. In the mold clamping process, a clamping cylinder 12 is provided behind the insert hole 13a in the holder 13 as a means for pulling the mold 11 so that the mold 11 is slidably moved on the base 14.

The mold 11 is provided at its rear end with a hook 18 for engagement with the clamping cylinder 12. Further, spacers 17, 17, the upper surface of each of which being in the form of an arc, are fixedly mounted on both side edges of the upper surface of the upper molding piece 11a along its axial direction. It is to be noted that in order to evenly clamp the whole surface of the mold 11, the spacers 17, 17 are positioned in such a manner that a portion where these spacers 17, 17 are in abutment with the below-mentioned clamping surface 15a is located at the middle of the mold 11 in its axial direction. Centrally formed on the upper surface of the upper molding piece is a hole 11c serving as a sprue when material is supplied. Additionally, guide pins or the like are provided in the interior of each of the upper molding piece 11a and the lower molding piece 11b so that the mold 11 may be opened and closed in a vertical direction.

Use of the clamping device of this embodiment will now be described.

The mold 11 placed on the base 14 is pulled upon engagement of the hook 18 with the clamping cylinder 12 and is thereby slidably moved thereon. Thus, the spacers 17, 17 on the upper surface of the mold 11 are brought into abutment with the clamping surface 15a of the regulating portion 15.

When the mold 11 is further pulled by means of the clamping cylinder 12, it is sandwiched between the base 14 and the clamping surface 15b and then, clamped to a wedge configuration.

Here, pulling force F of the clamping cylinder 12 is represented by the following formula (1):

$$F = N \sin \alpha + R \cos \alpha \qquad (1)$$

where N is normal force, R is frictional force and $\alpha$ is the angle of which the clamping surface is inclined relative to the base 14. Also, clamping force W of the mold 11 can be expressed as: $W = N \cos \alpha$. Substitution of this into the formula (1) gives $$F = W \sin \alpha / \cos \alpha = R \cos \alpha$$

Then, $$W = (F - R \cos \alpha)/\tan \alpha \qquad (2)$$

If coefficient of friction between the spacers 17 and the clamping surface 15a is denoted by μ, R is expressed as: $R=\mu N=\mu W/\cos \alpha$. Further, substitution of this into the formula (2) gives $$W=(F-\mu W)/\tan \alpha$$

Then, $$W=F/(\tan \alpha +\mu) \quad (3)$$

Now, the angle α of inclination is 2° and coefficient of friction μ ranges from 0.35 to 0.40 if the spacers 17, 17 and the regulating portion 15 are both made of hard steel. Substitution of these values into the formula (3) gives $$W = F/(\tan 2° + 0.40)$$
$$= F/(0.035 + 0.40)$$
$$\approx 2.3F$$

From the above, it can be said that the mold 11 may be clamped by a force which is two times greater than that which can be provided by the clamping cylinder 12. In addition, clamping force may be maintained by frictional force between the spacers 17, 17 and the clamping surface 15 even if the clamping cylinder 12 is disengaged from the hook 18. Thus, the clamping cylinder 12 need not be continuously operated, unlike the conventional process.

The angle α of inclination in relation to frictional force with regard to the clamping surface 15a for maintaining clamping force while clamping will now be considered. Force F necessary to release the mold 11 from the holder 13 is represented by the following formula:

$$-F=N \sin \alpha - R \cos \alpha$$

This is due to the fact that pulling force F and frictional force R are in opposite relation to the case shown in the formula (1). Since R is expressed as μN and further, as N tan λ (λ is the angle of friction between the spacers 17 and the clamping surface 15a), F is represented by the following formula:

$$F = -N \sin \alpha + N \tan \lambda \cdot \cos \alpha$$
$$\text{Then,} \quad = N \sin (\lambda - \alpha)/\cos \lambda$$

It is to be noted that λ is greater than α. This is due to the fact that if F is below zero, the mold 11 is naturally subject to release. Accordingly, the angle α of inclination of the clamping surface 15a is established smaller than the angle λ of friction between the spacers 17, 17 and the clamping surface 15a. Should both the spacers 17, 17 and regulating portion 15 be made of hard steel, the coefficient of friction μ ranges approximately from 0.35 to 0.40. When the value of μ(=0.35) is inserted in the equation: μ=tan λ, λis approximately 19°. Thus, the angle α of inclination of the clamping surface 15a is established smaller than 19°.

After the mold 11 is clamped in the holder 13, the holder 13 is moved by the feed means (not shown). Another mold in the other insert chamber 13a is clamped by means of the clamping cylinder 12 and the holder is again moved by the feed means. Subsequently thereafter molds to be placed in front of the clamping cylinder 12 are clamped and moved from the material injecting station to a mold removing station through a vulcanizing station and a mold opening and closing station. A this time, the mold 11 within the holder 13 is kept clamped even if the clamping cylinder 12 is released therefrom. Thus, a plurality of molds may be clamped by only one clamping cylinder 12. Further, when the mold 11 is clamped, the arc-like spacers 17, 17 are in abutment with the inclined clamping surface 15a. Hence, clamping force may evenly be effected even if the surfaces of the spacers 17, 17 and the clamping surface 15a are not sufficiently finished.

In the embodiment as above, the clamping cylinder 12 is provided behind the holder 13 as a means for abutting the spacers 17, 17 on the upper surface of the mold 11 with the clamping surface 15a upon movement of the mold 11. Alternatively, such means as a pusher or the like may be provided in front of the holder 13 so as to push the mold 11 from the front side of the holder 13 unless the mold 11 is released from the upper surface of the base 14.

Further, in the embodiment, the mold 11 is arranged transversely. Alternatively, the mold 11 and the holder 13 may be arranged vertically if guide rails or the like be provided in a manner to alternately engage the base 14 and the lower surface of the lower molding piece 11b.

Still further, in the embodiment, the spacers 17, 17 are fixedly mounted on both side edges of the upper surface of the upper molding piece 11a. If the sprue 11c is provided on one side of the mold 11 rather than on the upper portion of the upper molding piece 11a, only one spacer 17 is necessary to be provided at the central portion of the upper surface of the upper molding piece 11a. In addition, the arc portion forced on the upper surface of each of the spacers 17, 17 is preferably of larger radius in view of abrasion.

What is claimed is:

1. A clamping device for a mold, said mold including at least two sections which can be brought together to define a mold cavity which may be opened along a parting line defined where said sections adjoin when said sections are brought together, this parting line extending perimetrically of the mold, each of said at least two sections having an external, back surface located distally of said parting line, said back surfaces of said at least two sections being generally opposed to one another such that they face in generally axially opposite directions, with said parting line making a circuit of the mold intermediate such back surfaces, said clamping device comprising:

base surface means arranged to have said mold supported thereon with one of said mold back surfaces in frictional engagement therewith for linear, reversible sliding movement therealong longitudinally along a path;

clamping surface means disposed in spaced but confronting relation with said base surface means, so that a clamping chamber is defined between said base surface means and said clamping surface means, said clamping chamber being aligned with and at least partially enclosing said path;

securing means for securing said clamping surface means in fixed relation to said base surface means so that in a forwards direction along said path the distance between said clamping surface means and said base surface means gradually diminishes, and in a rearwards direction along said path, gradually enlarges;

a spacer means constructed and arranged to be mounted to the other of said mold back surfaces, this spacer means including a convexly humped back surface oriented when said spacer means is in place on said mold, for frictional engagement with said clamping surface means as said mold is slid along said path on said base surface means;

said clamping surface means being held so spaced and oriented relative to said base surface means by said securing means, that:
 (a) a clamping chamber entrance is formed at one end of said clamping surface means, at which entrance the distance between said clamping surface means and said base surface means is greater than the combined thickness of said mold and said spacer means, and
 (b) at a site intermediate the longitudinal extent of said clamping surface means, the distance between said clamping surface means and said base surface means is at least slightly less than the combined thickness of said mold and said spacer means; and means for urging said mold with said spacer means mounted thereto, through said clamping chamber entrance, into said clamping chamber, along said path in sliding engagement with said base surface means until said mold with said spacer means mounted thereto has reached said intermediate site, whereby said mold is held clamped-closed by said spacer means and said mold is wedged together between said base surface means and said clamping surface means, and thereafter for urging said mold with said spacer means mounted thereto along said path until said mold with said spacer means mounted thereto is no longer wedged between said base surface means and said clamping surface means.

2. The clamping device of claim 1, wherein:
said convexly humped spacer means back surface is curved by an angular amount which is smaller than the angle of friction between said clamping surface means and said convexly humped spacer means back surface at said intermediate site.

3. The clamping surface of claim 1, wherein:
said convexly humped spacer means back surface is adapted to cause said spacer means and said mold to become wedged at said intermediate site with said mold substantially centered at said intermediate site.

* * * * *